(12) United States Patent
Sen et al.

(10) Patent No.: US 10,781,709 B2
(45) Date of Patent: Sep. 22, 2020

(54) TURBINE ENGINE WITH A SEAL

(71) Applicant: GENERAL ELECTRIC COMPANY, Schenectady, NY (US)

(72) Inventors: Arnab Sen, Bangalore (IN); Jeffrey Douglas Rambo, Mason, OH (US); Rajesh Kumar, Bangalore (IN); Nathan Evan McCurdy Gibson, West Chester, OH (US); Robert Proctor, Mason, OH (US); Bhaskar Nanda Mondal, Bangalore (IN); Steven Douglas Johnson, Milford, OH (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 15/865,359

(22) Filed: Jan. 9, 2018

(65) Prior Publication Data

US 2019/0211699 A1    Jul. 11, 2019

(51) Int. Cl.
*F01D 11/00* (2006.01)
*F01D 25/12* (2006.01)

(52) U.S. Cl.
CPC ............ *F01D 11/001* (2013.01); *F01D 25/12* (2013.01); *F05D 2220/32* (2013.01); *F05D 2240/10* (2013.01); *F05D 2240/20* (2013.01); *F05D 2240/55* (2013.01); *F05D 2260/20* (2013.01); *F05D 2260/52* (2013.01); *F05D 2300/171* (2013.01); *F05D 2300/224* (2013.01)

(58) Field of Classification Search
CPC ...... F01D 11/001; F01D 11/003; F01D 11/10; F01D 25/12; F01D 1/18; F01D 1/20; F01D 1/24; F01D 1/26; F05D 2250/55; F16J 15/3404; F16J 15/3412; F16J 15/4472; F16J 15/3436; F16J 15/344
See application file for complete search history.

(56) References Cited

U.S. PATENT DOCUMENTS

| | | | |
|---|---|---|---|
| 3,516,757 A * | 6/1970 | Baumann | F03B 11/006 415/112 |
| 3,606,349 A | 9/1971 | Petrie et al. | |
| 4,082,296 A | 4/1978 | Stein | |
| 4,542,623 A | 9/1985 | Hovan et al. | |
| 4,916,892 A * | 4/1990 | Pope | F01D 11/003 277/305 |
| 5,403,019 A | 4/1995 | Marshall | |
| 5,971,400 A * | 10/1999 | Turnquist | F01D 11/005 277/416 |
| 5,975,537 A * | 11/1999 | Turnquist | F16J 15/443 277/411 |
| 6,505,834 B1 | 1/2003 | Dinc et al. | |
| 7,175,388 B2 | 2/2007 | Labbe et al. | |
| 9,004,495 B2 * | 4/2015 | Vasagar | F01D 11/003 277/579 |
| 9,051,882 B2 * | 6/2015 | Copeland | F02C 7/28 |
| 9,279,341 B2 | 3/2016 | Durocher et al. | |

(Continued)

*Primary Examiner* — Kenneth J Hansen
*Assistant Examiner* — Maxime M Adjagbe
(74) *Attorney, Agent, or Firm* — McGarry Bair PC (57) ABSTRACT

A turbine engine includes an engine core defining a higher pressure region and a lower pressure region. A seal can fluidly separate the higher pressure region from the lower pressure region and be movably mounted to a component within the turbine engine, where a side of the seal can confront the component.

17 Claims, 6 Drawing Sheets

(56) References Cited

U.S. PATENT DOCUMENTS

| | | | |
|---|---|---|---|
| 2003/0185669 A1* | 10/2003 | Brauer | F01D 11/025 415/111 |
| 2013/0017057 A1* | 1/2013 | Lagueux | F01D 11/22 415/1 |
| 2014/0020359 A1* | 1/2014 | Mimura | F01D 9/065 60/39.182 |
| 2016/0201494 A1* | 7/2016 | Rogers | F16J 15/104 277/594 |
| 2016/0201805 A1 | 7/2016 | Lewis | |
| 2017/0067397 A1 | 3/2017 | Fang et al. | |
| 2017/0292394 A1 | 10/2017 | Duffy et al. | |

* cited by examiner

TURBINE ENGINE WITH A SEAL

BACKGROUND

Turbine engines, and particularly gas or combustion turbine engines, are rotary engines that extract energy from a flow of pressurized combusted gases passing through the engine onto rotating turbine blades.

Gas turbine engines utilize a mainstream flow to drive the rotating turbine blades to generate thrust. The mainstream flow is propelled by combustion of gas to increase the thrust generated by the engine. The combustion of gas generates excessive temperatures within the engine turbine, requiring cooling of certain components. Such cooling can be accomplished through providing air from the mainstream flow bypassing the combustor having a lower temperature, unheated by the gas combustion. Sealing members can be utilized for directing airflows to desired locations within the engine, as well as preventing hotter mainstream flow gases from reaching undesired locations within the engine.

BRIEF DESCRIPTION

In one aspect, the disclosure relates to a turbine engine including an engine core having a stator and a rotor and also defining a higher pressure region and a lower pressure region, a seal fluidly separating the higher pressure region from the lower pressure region and movably mounted to the stator, the seal having a first side confronting the stator and a second side confronting the rotor, and an air supply conduit fluidly coupling the higher pressure region to at least one of the first side and second side of the seal.

In another aspect, the disclosure relates to a turbine engine including an engine core having an outer casing, an outer rotor, and an inner rotor which rotates in a direction opposite the outer rotor, and also defining a higher pressure region and a lower pressure region, a seal fluidly separating the higher pressure region from the lower pressure region and movably mounted to one of the outer rotor or inner rotor, the seal having a first side confronting the one of the outer rotor or inner rotor and a second side confronting the other of the outer rotor or inner rotor, and an air supply conduit fluidly coupling the higher pressure region to at least one of the first side and second side of the seal.

In yet another aspect, the disclosure relates to a seal assembly including a carrier having a first portion configured to fluidly couple to a higher pressure region, a contact arm having a second portion configured to fluidly couple to the higher pressure region, a seal having a first side confronting the carrier and a second side confronting the contact arm, and an air supply conduit fluidly coupling one of the first and second sides to one of the first and second portions.

In still another aspect, the disclosure relates to a method of reducing a pressure differential across a seal having at least one side, the seal being disposed between a rotor and a stator and between a higher pressure region and a lower pressure region, wherein an air supply conduit fluidly couples the higher pressure region to the at least one side. The method includes supplying, via the air supply conduit, air from the higher pressure region to the at least one side of the seal.

DESCRIPTION OF EMBODIMENTS

The described embodiments of the present disclosure are directed to a seal for a turbine engine. For purposes of illustration, the present disclosure will be described with respect to the compressor for an aircraft turbine engine. It will be understood, however, that the disclosure is not so limited and may have general applicability within an engine, including turbines, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
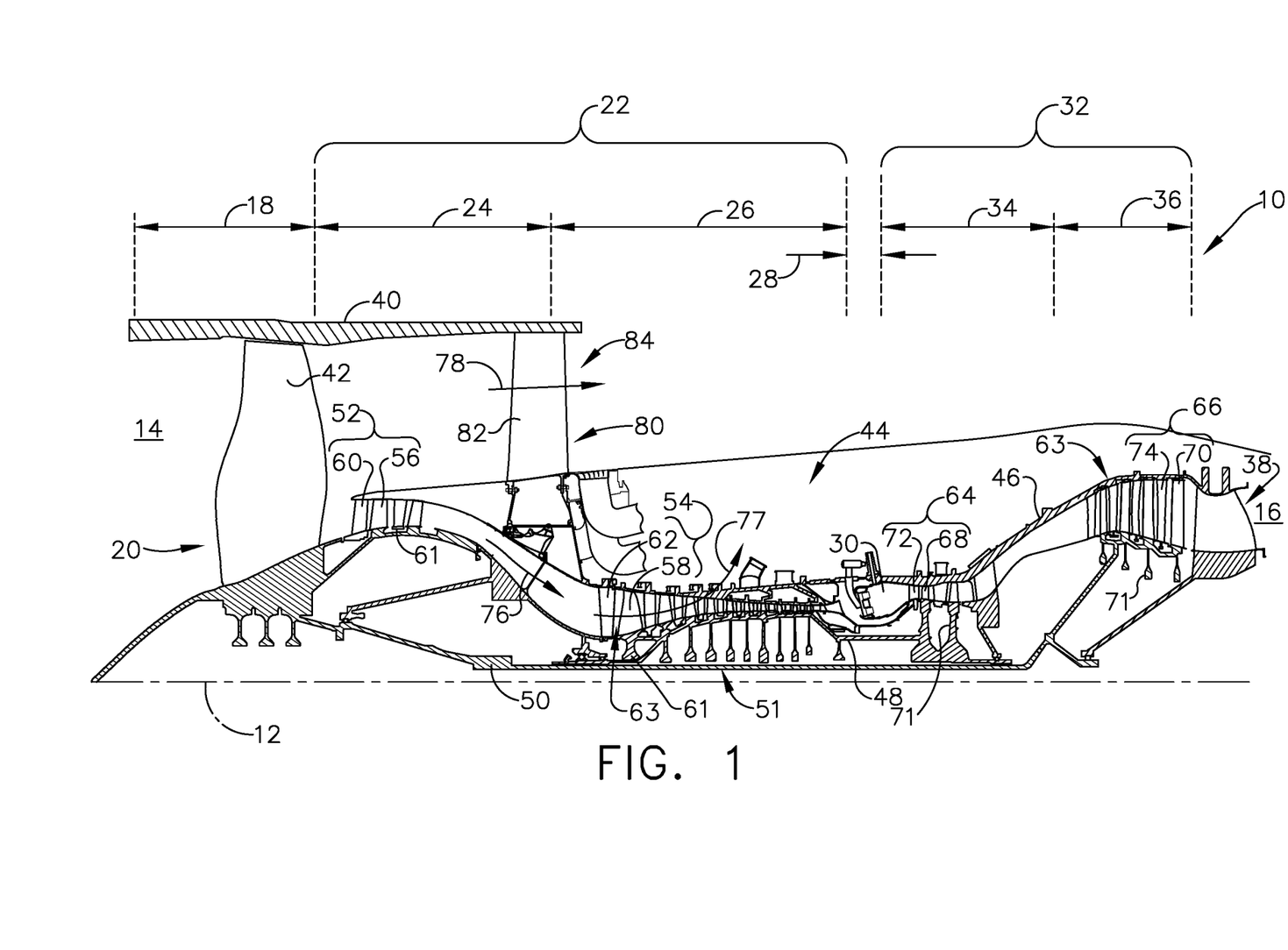
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by an annular core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51. In addition, the spools 48, 50 can rotate in the same direction or in opposite directions relative to one another.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible. In addition, while the exemplary compressor vanes 60, 62 are described herein as being static, it is also contemplated that they can be rotatable in a direction opposite that of the compressor blades 56, 58.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. While the exemplary turbine vanes 72, 74 are described herein as being static, it is also contemplated that they can be rotatable in a direction opposite that of the turbine blades 68, 70. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
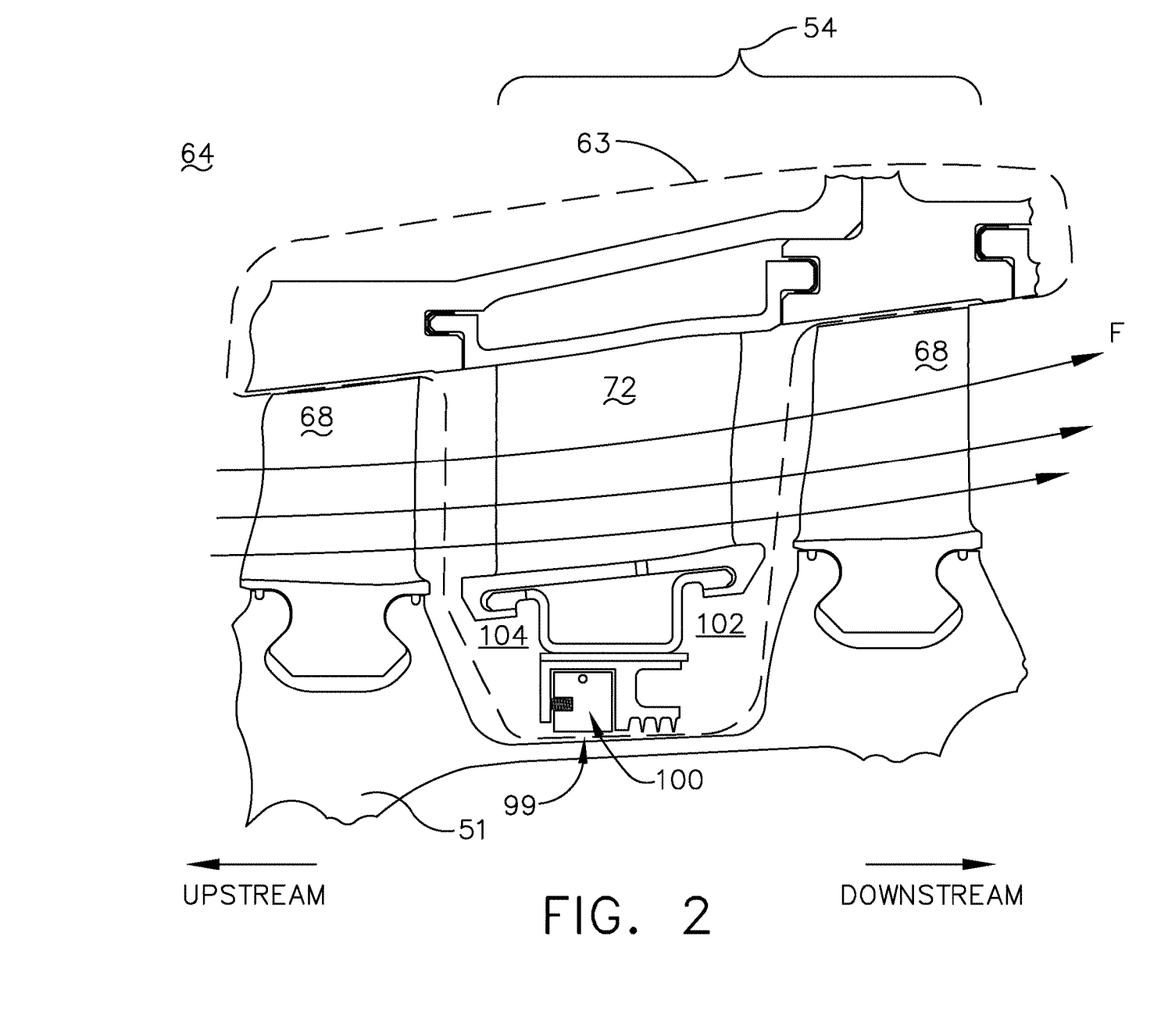
FIG. 2 is a circumferential view of a portion of a turbine in the turbine engine of FIG. 1 including a seal according to various aspects described herein.

FIG. 2 illustrates a circumferential view of a portion of a turbine, such as the HP turbine 34, in the turbine engine of FIG. 1. The HP turbine 34 includes the exemplary turbine stage 64 with the HP turbine vane 72, HP turbine blades 68, and a mainstream airflow F is illustrated through the annular turbine stage 64 as shown. The annular casing 46 (FIG. 1) can surround the turbine stage 64, including the rotor 51 and stator 63, in a circumferential direction about the engine centerline 12 (FIG. 1).

A seal assembly 99 can be positioned within the casing 46 and movably mounted to the stator 63. A seal 100 can be included in the seal assembly 99 and can be formed from any material suitable for its environment, including carbon, steel, nickel alloy, ceramic, or any graphite-based material such as graphaloy or graphene, in non-limiting examples. During operation of the engine 10, air flowing through the turbine 34 (illustrated by arrows F) can undergo expansion while also moving away from the combustor 30 (FIG. 1), which emits radiant heat and has convective effects on the air in its vicinity. As a result, air downstream of the turbine stage 64 can have a lower temperature and pressure than air upstream of the turbine stage 64, and the seal 100 can fluidly separate a higher pressure region 104 from a lower pressure region 102 within the engine core 44 as illustrated. While illustrated within the HP turbine 34, it should be understood that the seal assembly 99 can be positioned anywhere within the turbine engine 10 as desired, including within the compressor section 22, within a conduit (not shown) through which bleed air 77 flows (FIG. 1) for cooling purposes, or in a turbine engine with a high-speed spool and a low-speed spool, in non-limiting examples.

Figure 3:
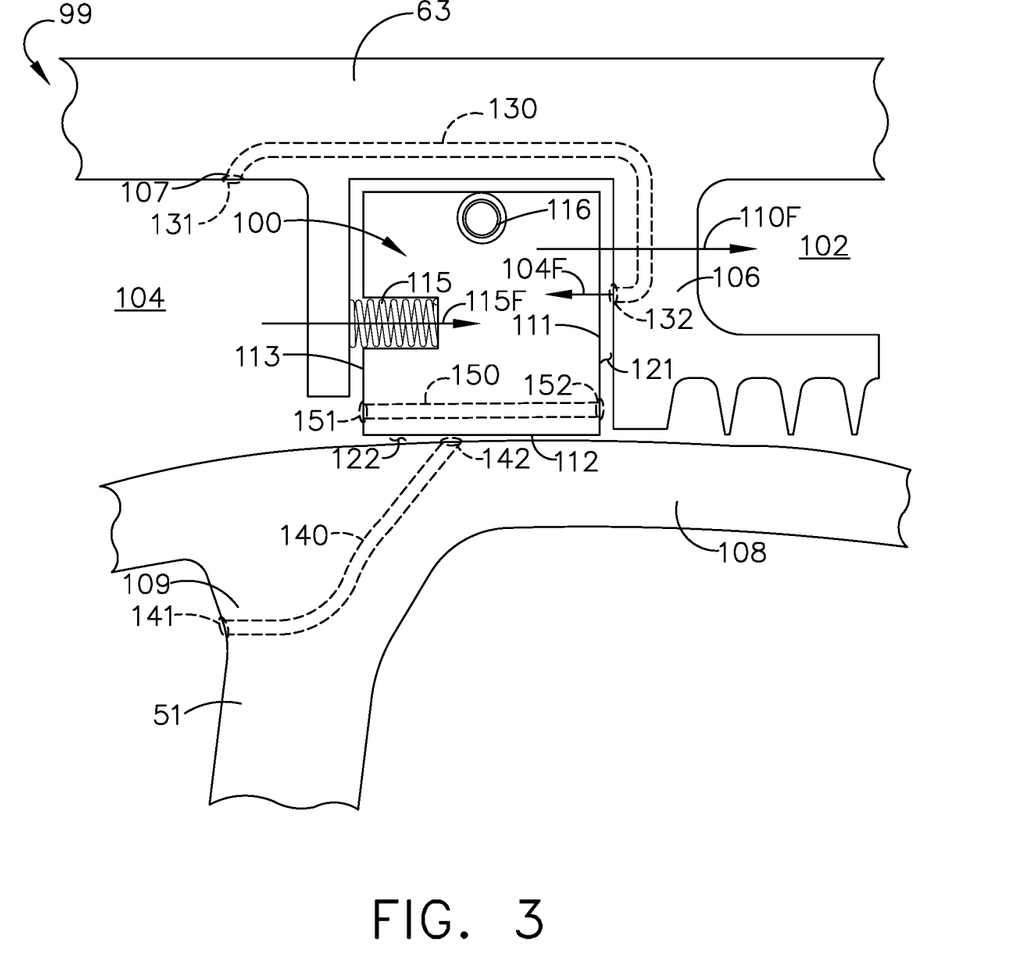
FIG. 3 is a cross-sectional view of the seal of FIG. 2 according to a first aspect.

Referring now to FIG. 3, the seal assembly 99 is shown in further detail wherein a portion of the stator 63, illustrated as a carrier 106, can confront a first side 111 of the seal 100 while a portion of the rotor 51, illustrated as an arm 108, can confront a second side 112 of the seal 100. A third side 113 of the seal 100 can be fluidly coupled to the higher pressure region 104 as shown. In this manner the seal 100, carrier 106, and rotor 51 can at least partially define the seal assembly 99 utilized in the turbine engine 10.

The seal 100 can be movably mounted to the stator 63 via a first spring 115 configured to apply an axial force 115F on the seal 100. The seal 100 can also be coupled to the stator 63 via a second spring 116 configured to exert a second force (not shown) on the seal 100 in the circumferential direction about the engine centerline 12 (FIG. 1). It is contemplated that the second force can be exerted in any desired direction, including a direction that is orthogonal to or non-aligned with the axial force 115F. Furthermore, any desired mechanical components can be utilized for the first spring 115 and second spring 116, such as an elastic member or other flexible component.

At least one gap can be formed between the seal 100 and the rotor 51 or the stator 63, due to the relative rotation between the rotor 51 and stator 63 and the movable mounting of the seal 100 to the stator 63. An exemplary first gap 121 is illustrated adjacent the first side 111 of the seal 100, and an exemplary second gap 122 is shown adjacent the second side 112. It should be appreciated that the first and second gaps 121, 122 can have equal or differing sizes, and these sizes can vary during operation of the engine 10. In this manner, the lower pressure region 102 can be fluidly coupled to the first or second sides 111, 112 by way of the first or second gaps 121, 122, respectively.

With continued reference to FIG. 3, the seal assembly 99 can further include at least one air supply conduit fluidly coupling the higher pressure region 104 to any desired side of the seal 100, including at least one of the first side 111 and second side 112. In the example illustrated, a stator air supply conduit 130 includes a stator inlet 131 formed in a first portion 107 of the stator 63 fluidly coupled to the higher pressure region 104, as well as a stator outlet 132 fluidly coupled to the first gap 121 and the first side 111. In addition, a rotor air supply conduit 140 includes a rotor inlet 141 formed in a second portion 109 of the rotor 51 fluidly coupled to the higher pressure region 104, as well as a rotor outlet 142 fluidly coupled to the second gap 122 and the second side 112. It is also contemplated that the seal 100 can include a seal air supply conduit 150, illustrated as having a seal inlet 151 fluidly coupled to the higher pressure region 104 and a seal outlet 152 fluidly coupled to the first side 111. It will be understood that any number of air supply conduits may be utilized in the seal assembly 99, e.g. providing a single air supply conduit only, or providing multiple stator air supply conduits 130 with stator outlets 132 fluidly coupled to the first side 111, or utilizing a branched air supply conduit having a single inlet and multiple outlets to provide pressurized air to multiple sides of the seal 100, in non-limiting examples. Exact positions or arrangements of air supply conduits can vary from those illustrated herein. Furthermore, the air supply conduits 130, 140, 150 can be formed by any desired process including casting, drilling, or additive manufacturing, in non-limiting examples.

In operation, the seal 100 can experience opposing forces from the higher pressure region 104 and lower pressure region 102 by way of the first and second gaps 121, 122 and the third side 113. A differential force 110F on the seal 100 arises from the pressure difference (also referred to as "differential pressure") between the low and higher pressure regions 102, 104. In the example of FIG. 3, the differential force 110F points axially toward the lower pressure region 102, in which case the axial force 115F from the first spring 115 can oppose the differential force 110F to help keep the seal 100 in position.

Furthermore, air from the higher pressure region 104 can flow through the air supply conduits 130, 140, 150 and into the first or second gaps 121, 122, thereby exerting a fluid force 104F on the seal 100 and effectively reducing the amount of differential force 110F on the seal. It can be appreciated that in environments with a high differential pressure, the differential force 110F on the seal 100 can exceed the capability of the first spring 115 to bias the seal 100 toward its desired position. Use of the air supply conduits 130, 140, 150 can reduce the differential force 110F, preserve the first gap 121 (e.g. the first side 111 can be prevented from extended contact with the carrier 106 due to the differential force 110F), and improve the effectiveness of the first spring 115 in a variety of environments. It can be further appreciated that preservation of the first gap 121 can also reduce frictional forces between the seal 100 and carrier 106 during operation of the engine 10; furthermore, preservation of the first gap 121 can allow the seal 100 to traverse radially under the counter-balance of the second spring 116. In still another example, the rotor air supply conduit 140 can provide an airflow path to cool the rotor 51, including the arm 108, Referring now to FIG. 4, another seal assembly 199 is illustrated which can be utilized in the turbine engine 10 of FIG. 1. The seal assembly 199 is similar to the seal assembly 99; therefore, like parts will be identified with like numerals increased by 100, with it being understood that the description of the like parts of the seal assembly 99 applies to the seal assembly 199, unless otherwise noted.

The seal assembly 199 includes a seal 200 fluidly separating a higher pressure region 204 from a lower pressure region 202, movably mounted to a carrier 206 of the stator 63 and also confronting an arm 208 of the rotor 51. A first gap 221 can be formed between a first side 211 of the seal 200 and the carrier 206, and a second gap 222 can be formed between a second side 212 of the seal 200 and the arm 208. It is also contemplated in the example of FIG. 4 that the seal 200 and rotor 51 can each be made from steel, nickel alloy, or any material having a higher temperature capability than carbon. As used herein, "temperature capability" can be defined as the highest operating temperature contemplated for use for a given material in the turbine engine environment, and subjecting the material to temperatures higher than its temperature capability can cause effects such as oxidation, fatigue, or melting of the material.

A stator air supply conduit 230 can be provided having a stator inlet 231 fluidly coupled to the higher pressure region 204 and a stator outlet 232 fluidly coupled to the first gap 221. It is contemplated in the example of FIG. 4 that the stator outlet 232 can further include a counterbore 260 having a set of openings 261 fluidly coupled to the stator air supply conduit 230, wherein pressurized air flowing through the air supply conduit 230 can flow through the openings 261 and provide for film cooling of the seal 200 or carrier 206. The openings 261 can have any desired cross-sectional profile, including circular, conical, irregular, or with squared corners, in non-limiting examples. A counterbore 260 can confront the first gap 221, while a second counterbore 262 can also be utilized at a rotor outlet 242 of a rotor air supply conduit 240 with a rotor inlet 241 fluidly coupling the higher pressure region 204 and the second gap 222. Additional counterbores 260 can be further utilized in a seal air supply conduit (not shown) fluidly coupling the higher pressure region 204 to the first or second gaps 221, 222, or in any desired air supply conduit as desired. In this manner, a counterbore 260 can be located in a portion of the stator 63 that confronts the first side 211, while a second counterbore 262 can be located in a portion of the rotor 51 that confronts the second side 212 of the seal 200.

Figure 4:
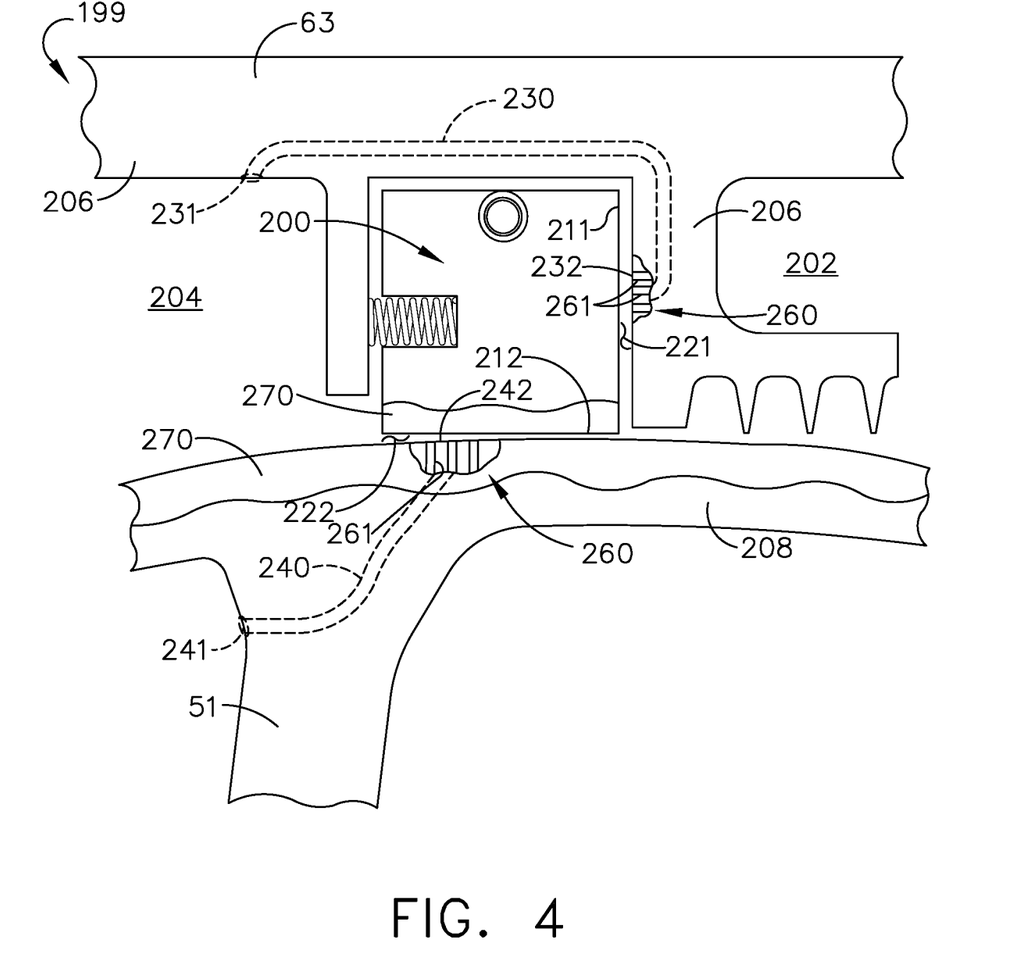
FIG. 4 is a cross-sectional view of the seal of FIG. 2 according to a second aspect.

In addition, motion of the rotor 51 with respect to the stator 63 as described in FIG. 1 can generate occasional contact between the seal 200 and the arm 208 of the rotor 51; furthermore, high temperature gases in the environment can produce wear along the seal 200 or rotor 51. It is contemplated that either or both of the seal 200 and the arm 108 can include a wear coating 270; in one non-limiting example, a plasma spray (PS) coating such as PS300 or PS400 can be utilized to further increase the temperature capability and durability of the seal assembly 199 for use in various locations within the turbine engine 10. It should be appreciated that the wear coating 270 can be used in combination with any of the air supply conduits described herein, including the stator air supply conduit 230 or rotor air supply conduit 240, and the counterbore 260 can be formed in or through the wear coating 270 as desired.

Figure 5:
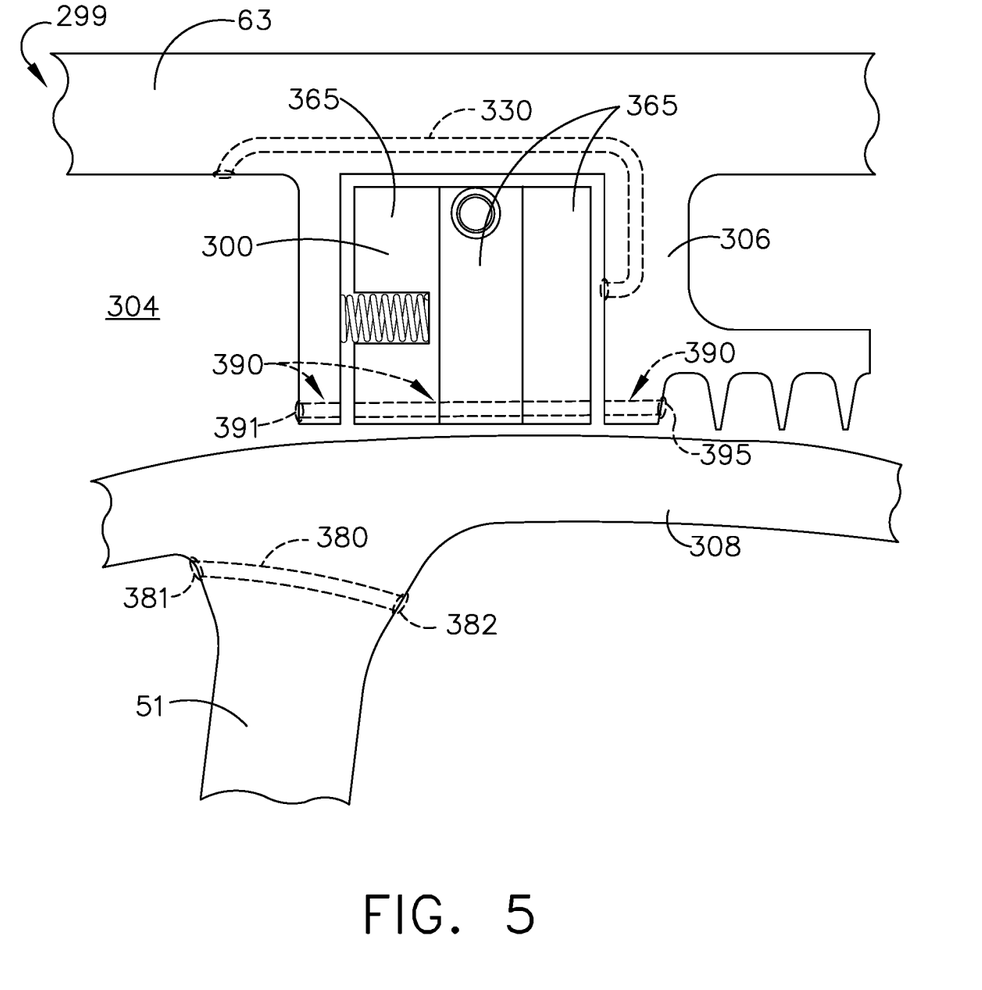
FIG. 5 is a cross-sectional view of the seal of FIG. 2 according to a third aspect.

Turning to FIG. 5, another seal assembly 299 is illustrated which can be utilized in the turbine engine 10 of FIG. 1. The seal assembly 299 is similar to the seal assembly 99; therefore, like parts will be identified with like numerals further increased by 100, with it being understood that the description of the like parts of the seal assembly 99 applies to the seal assembly 299, unless otherwise noted.

The seal assembly 299 includes a seal 300 (partially shown in phantom) fluidly separating a higher pressure region 304 from a lower pressure region 302, movably mounted to a carrier 306 of the stator 63 and also confronting an arm 308 of the rotor 51. It is further contemplated that the seal 300 can be formed of segments 365 which can be sealed together, including by way of overlapping or complementary geometric features e.g. shiplaps, or via polymers or any other sealant appropriate for the environment, to minimize any fluid leakage between the segments 365, including in a non-limiting example where the seal 300 is made from carbon. The segments 365 are illustrated schematically in an axial direction, and it should be understood that the segments 365 can be formed in a circumferential arrangement, or formed in multiple overlapping directions, in non-limiting examples. In one example where the segments 365 are made of carbon, the carbon segments 365 can provide added robustness to the seal 300 under the applied forces in operation as described in FIG. 3. In another non-limiting example where the segments 365 include shiplaps, the shiplap segments 365 can slide or expand during operation of the turbine engine 10 (FIG. 1). It should be further understood that the segmented seal as described in the example of FIG. 5 can be utilized in any embodiment described herein.

In addition, the arm 308 can include a rotor cooling passage 380 with a rotor cooling inlet 381 fluidly coupled to the higher pressure region 204 and a rotor cooling outlet 382 fluidly coupled to the lower pressure region 202. In addition, the carrier 306 can include a stator cooling passage 390 with a stator cooling inlet 391 fluidly coupled to the higher pressure region 304 and a stator cooling outlet 392 fluidly coupled to the lower pressure region 302. In the example shown, the stator cooling passage 390 can include a plurality of cooling passages 390, including one or more first stator cooling passages 391 through the stator 63 which are in registry with a second stator cooling passage 392 through the seal 300 as shown. In this manner, pressurized air can be supplied to portions of the rotor 51 and stator 63 proximate the lower pressure region 202 for cooling purposes, and the amount of air supplied through the cooling passages 380, 390 can be tailored or adjusted based on the shape or size of their respective cooling inlets 381, 391 or cooling outlets 382, 392, or based on the shape or profile of the cooling passages 380, 390 themselves.

Figure 6:
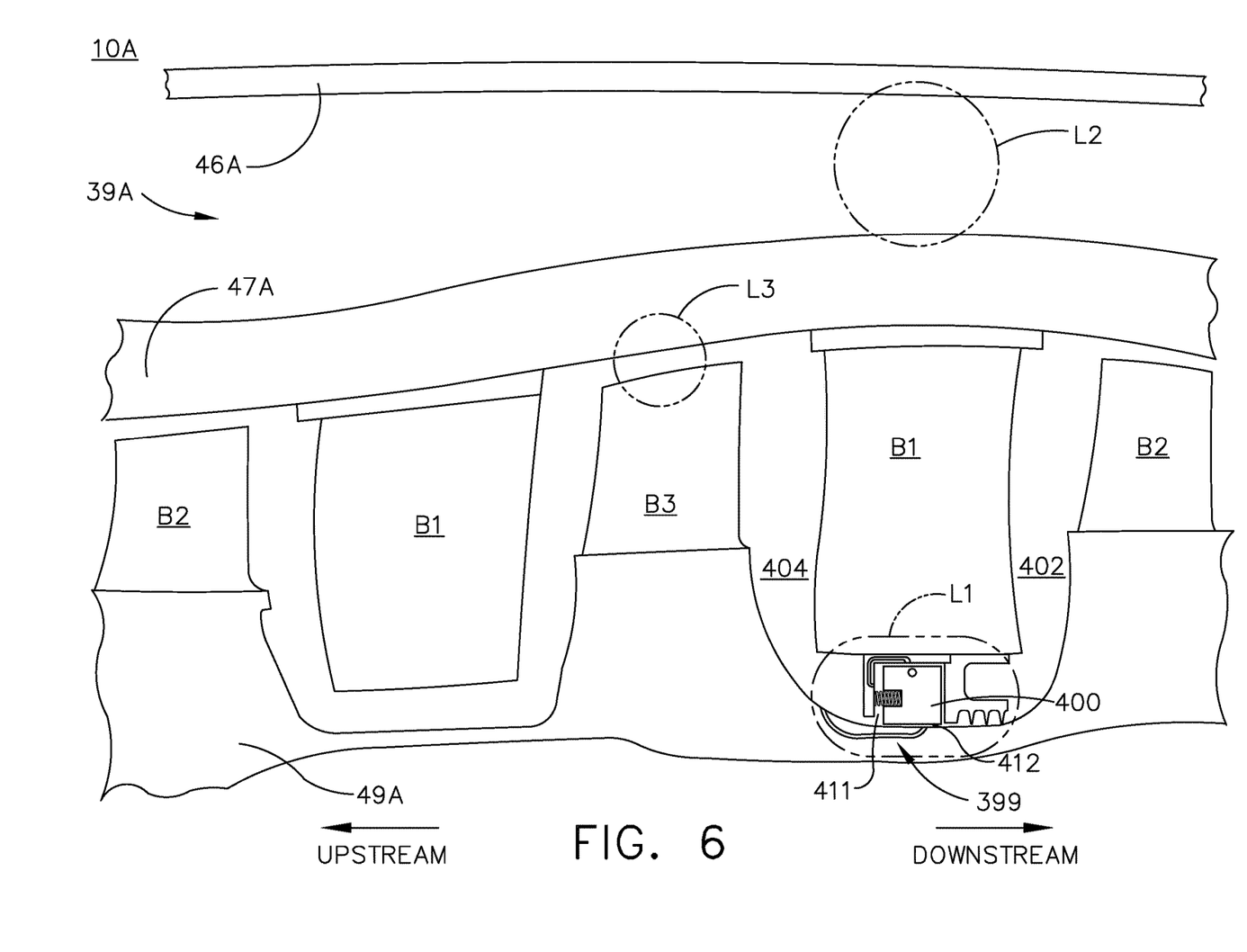
FIG. 6 is a schematic view of another turbine engine for an aircraft including a seal according to various aspects described herein.

Turning to FIG. 6, another seal assembly 399 is illustrated which can be utilized in a turbine engine 10A. The seal assembly 399 is similar to the seal assembly 99; therefore, like parts will be identified with like numerals further increased by 100, with it being understood that the description of the like parts of the seal assembly 99 applies to the seal assembly 399, unless otherwise noted. Furthermore, the seal assembly 399 is contemplated for use in another turbine engine 10A similar to the turbine engine 10; therefore, like parts of the turbine engine 10A will be identified with like numbers appended with 'A', with it being understood that the like parts of the turbine engine 10 applies to the turbine engine 10A, unless otherwise noted.

A portion of the turbine engine 10A is illustrated in FIG. 7, more specifically a HP turbine 34A (similar to the HP turbine 34 of FIG. 1), where the turbine engine 10A can include a core casing 46A (similar to that of FIG. 1) surrounding a rotor 51A. More specifically, the rotor 51A includes an outer rotor 47A and an inner rotor 49A which rotates in a direction opposite that of the outer rotor 47A.

The HP turbine 34A can include at least one outer blade B1 and at least one inner blade B2 mounted to the outer rotor 47A and inner rotor 49A, respectively, thereby forming pairs of counter-rotating blades B1, B2 in a turbine stage 64A. It will be understood that such pairs of outer and inner blades B1, B2 can form stages anywhere within the turbine engine 1, including in a compressor section or turbine section. Furthermore, the seal assembly 399 is illustrated in a first location L1 between the outer and inner rotors 47A, 49A adjacent a blade B1; it is also contemplated that the seal assembly 399 can be positioned at a second location L2 between the outer rotor 47A and core casing 46A, or at a third location L3 between the outer and inner rotors 47A, 49A adjacent a blade B2, in non-limiting examples.

The seal assembly 399 includes a seal 400 fluidly separating a higher pressure region 404 from a lower pressure region 402 and movably mounted to the outer rotor 47A. The seal 400 includes a first side 411 confronting the outer rotor 47A and a second side 412 confronting the inner rotor 49A as shown.

The outer rotor 47A can include an outer rotor air supply conduit 430 fluidly coupling the higher pressure region 404 to the first side 411 in a similar manner to that described in FIGS. 3-5. The inner rotor 49A can also include an inner rotor air supply conduit 440 fluidly coupling the higher pressure region 404 to the second side 412, thereby reducing the pressure differential across the seal 400 as described above.

While not illustrated, the seal assembly 399 in the turbine engine 1 can further include wear coatings on any or all of the seal 400, outer rotor 47A, or inner rotor 49A as described in FIG. 4. Cooling passages (not shown) can also be included in either of both of the outer rotor 47A or inner rotor 49A as described in FIG. 5. It will be understood that aspects of the seal assembly 99, 199, 299, 399 can be combined in any desired order, and used in a variety of turbine engines including those with fixed stators or counter-rotating outer and inner rotors.

A method of reducing a pressure differential, including the differential force 110F, across the seal 100 includes supplying air via the stator, rotor, or seal air supply conduits 130, 140, 150 from the higher pressure region 104 to the first or second sides 111, 112 of the seal 100 (FIG. 1). Air can therefore be supplied through the rotor 51, through the stator 63, or through the seal 100; any of the outlets 132, 142, 152 can thereby exert a fluid force on at least one side of the seal 100. The method can further include exerting the axial force 115F on the seal 100 by way of the first spring 115, where the axial force 115F can at least partially counteract the differential force 110F on the seal 100.

Aspects of the present disclosure provide for a variety of benefits. The use of a carbon seal can allow for minimizing the size of the gap between the seal and rotor, providing a smaller clearance between the rotor and stator which can improve sealing performance. In one example, the clearance was reduced by nearly a factor of 8 compared to traditional sealing arrangements in turbine engines.

Additionally, a large pressure differential across the seal during engine operation can cause seal breakdown or undesired leakages; it can be appreciated that reducing the differential force by way of the air supply conduits can allow the seal to be utilized in more extreme environments. The wear coatings or choice of material such as steel or nickel alloy can further increase the environmental options for seal placement, such as in environments exceeding the temperature capability of carbon materials.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine engine comprising:
    an engine core comprising at least a compressor section, a combustor section, and a turbine section in axial flow arrangement and defining a rotor and a stator, multiple, axially spaced stages of paired rotating blades, carried by the rotor, and stationary vanes, carried by the stator, and defining a higher pressure region on one of an upstream or downstream side of the stationary vanes for a given stage and a lower pressure region on the other of the upstream or downstream side of the stationary vanes for the given stage;
    a seal fluidly separating the higher pressure region from the lower pressure region and movably mounted to the stator, the seal having a first side confronting the stator and a second side confronting the rotor; and
    an air supply conduit fluidly coupling the higher pressure region to at least one of the first side and the second side of the seal a first counterbore in a portion of the stator that confronts the first side, wherein the first counterbore is fluidly coupled to the air supply conduit; and
    a second counterbore in a portion of the rotor that confronts the second side and is fluidly coupled to the air supply conduit.

2. The turbine engine of claim 1 further comprising a spring configured to apply an axial force to the seal.

3. The turbine engine of claim 2 further comprising a second spring configured to apply a second force to the seal, the second force being non-aligned with the axial force.

4. The turbine engine of claim 1 wherein the seal comprises one of carbon, steel, or a nickel alloy.

5. The turbine engine of claim 1 wherein the seal further comprises a plurality of segments.

6. The turbine engine of claim 1 further comprising a wear coating on one of the seal, the rotor, or the stator.

7. The turbine engine of claim 1 further comprising a stator cooling passage fluidly coupling the higher pressure region to the first side of the seal.

8. The turbine engine of claim 1 further comprising a rotor cooling passage fluidly coupling the higher pressure region to the lower pressure region.

9. A turbine engine comprising:
    an engine core comprising at least a compressor section, a combustor section, and a turbine section in axial flow arrangement and defining an outer rotor and an inner rotor which rotates in a direction opposite the outer rotor, multiple, axially spaced stages of paired inner blades carried by the inner rotor, and outer blades, carried by the outer rotor, and defining a higher pressure region on one of an upstream or downstream side of the inner or outer blades for a given stage and a lower pressure region on the other of the upstream or downstream side of the inner or outer blades for the given stage;
    a seal fluidly separating the higher pressure region from the lower pressure region and movably mounted to one of the outer rotor or the inner rotor, the seal having a first side confronting the one of the outer rotor or the inner rotor and a second side confronting the other of the outer rotor or the inner rotor; and
    an air supply conduit fluidly coupling the higher pressure region to at least one of the first side and the second side of the seal; and
    a counterbore in a portion of at least one of the outer rotor and the inner rotor that confronts one of the first or second sides, wherein the counterbore is fluidly coupled to the air supply conduit.

10. The turbine engine of claim 9 further comprising a wear coating on one of the seal, the outer rotor, or the inner rotor.

11. A method of reducing a pressure differential across a seal having at least one of a first side and a second side, the seal movably mounted to a stator or a rotor of a gas turbine engine having multiple, axially arranged stages of paired rotating blades and stationary vanes, and between a higher pressure region and a lower pressure region, wherein an air supply conduit fluidly couples the higher pressure region to the at least one of the first side and the second side, the method comprising:

supplying, via the air supply conduit, air from the higher pressure region to the at least one of the first side confronting the stator and the second side confronting the rotor of the seal movably mounted to the stator or the rotor, wherein a first counterbore in a portion of the stator that confronts the first side, and wherein the first counterbore is fluidly coupled to the air supply conduit, and a second counterbore in a portion of the rotor that confronts the second side, and wherein the second counterbore is fluidly coupled to the air supply conduit.

12. The method of claim 11 wherein the supplying further comprises supplying air through the rotor to the at least one of the first side and the second side.

13. The method of claim 12 wherein the supplying further comprises supplying air through the stator to the at least one of the first side and the second side.

14. The method of claim 11 wherein the supplying further comprises supplying air through the seal to the at least one of the first side and the second side.

15. The method of claim 11 further comprising exerting, via a spring, an axial force on the seal.

16. The method of claim 15 further comprising exerting, via a conduit outlet, a fluid force on the at least one of the first side and the second side of the seal.

17. The method of claim 16 wherein the fluid force counteracts the axial force.

* * * * *